Nov. 10, 1959   R. W. PREISING   2,911,995
VALVE HAVING ALTERNATIVE CLOSING POSITIONS AND
A REVERSIBLE, DOUBLE FACED VALVE ELEMENT
Filed July 30, 1956

INVENTOR.
RICHARD W. PREISING
BY
Knox & Knox

900
United States Patent Office 2,911,995
Patented Nov. 10, 1959

2,911,995

VALVE HAVING ALTERNATIVE CLOSING POSITIONS AND A REVERSIBLE, DOUBLE FACED VALVE ELEMENT

Richard William Preising, Escondido, Calif.

Application July 30, 1956, Serial No. 601,022

1 Claim. (Cl. 137—329.02)

This invention relates generally to valves and more particularly to a valve structure wherein the valve element has alternative closing positions, and wherein the valve element is reversible and double-faced.

This application is a continuation-in-part of my presently pending application in the United States Patent Office, Serial No. 536,941, filed September 27, 1955, now abandoned, under the title "Self-Sealing Valve."

A primary object of this invention is to provide a valve assembly wherein the sealing element can be shifted so as to contact two different valve seats selectively, the pressure of the fluid being utilized to bias the sealing element into sealing relation with one of these seats when the valve element is turned to one position, and the valve being closed by shifting the valve element into contact with the other seat when this alternative closing action is desired. A very important ancillary object is the provision of such a valve, so that, when the pressure is sufficient, the valve element will be sealed by the pressure in the pipes or this pressure will at least be available for use in assuring a tight sealing action, but in the event that this pressure is insufficient or suddenly becomes insufficient for this purpose, the valve element can be shifted to the second position wherein the sealing is assured without reliance upon pressure in the inlet portion of the valve assembly.

Another object of this invention is to provide a valve in which the sealing element is freely rotatable with respect to the valve stem, thus preventing over-tightening of the valve and preventing injury to the sealing element often encountered as a result of over-tightening, and it is also noted that the instant construction prevents the forcible rotation of the valve element after the same has engaged either of the alternative valve seats. It is true that the valve sealing element can be forced down more tightly against one of these seats by the rotation of the valve stem, but the valve stem is free to rotate relative to the valve sealing element and unnecessary wear and damage to the valve sealing element is prevented as a result.

Still another object of this invention is to prevent a valve sealing element which is, aside from being disposable in two positions, also reversible so that, should one of the faces of the valve element become worn, the valve element can be reversed or inverted and so present a different face to the valve seat against which it is to be pressed. Since in the normal use of this valve, especially when used in faucets in the home, the valve element will be moved against one valve seat rather than the other, this reversible feature has particular significance, and it should be noted that in the event that the valve element is inverted, the secondary function thereof in being closable against a second valve seat is still retained, even though the valve element may have become slightly worn.

Still another object of this invention is to provide a valve assembly wherein the valve body has a removable body portion facilitating the machining of a valve seat in the body portion, further facilitating assembly and also providing access to the sealing element for any necessary repair, this advantage of construction being retained without limiting in any way against the retention of all the other advantages of this valve construction.

And a last object to be mentioned specifically is to provide a valve assembly which is well adapted for economical fabrication and which is generally efficient and durable in use.

With these and other objects which will become evident later in this disclosure, this invention consists in the novel construction, combination and arrangement of elements and portions, as will be hereinafter fully described in the specification, particularly pointed out in the claim, and illustrated in the drawing which forms a material part of this disclosure, and in which:

Similar characters of reference indicate similar or identical elements and portions throughout the specification and throughout the different figures in the drawing.

Figure 1:
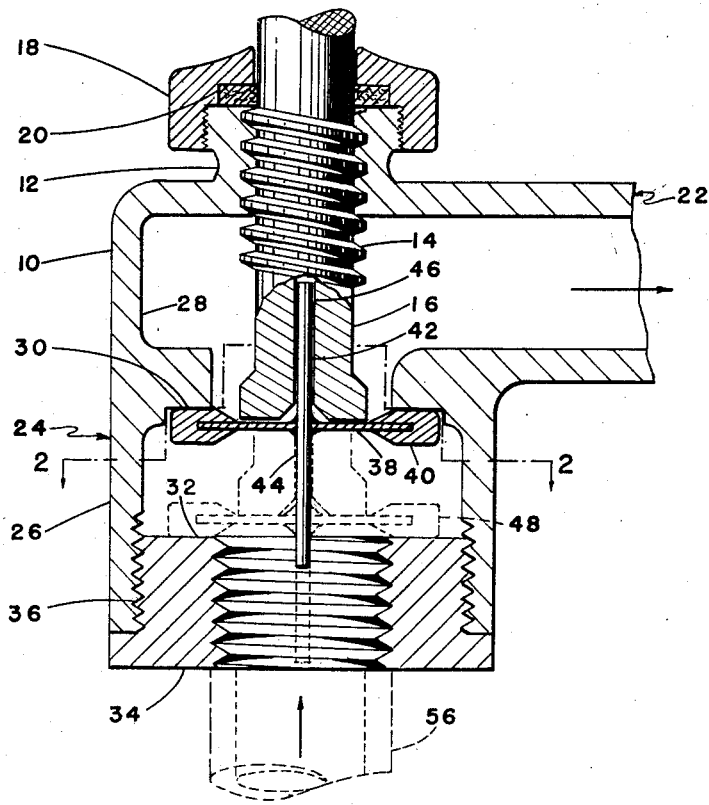
Figure 1 is a fragmentary, vertical sectional view of the valve assembly, the inlet pipe to be used therewith being shown in dash line, and the valve element being shown in a second position in dash line, this second position being that assumed by the valve element when the valve is closed by engagement of the valve sealing element against the second valve seat.

Referring now to the drawing in detail, the valve body, generally indicated at 10, includes a neck 12 internally threaded to receive a threaded portion 14 or a valve stem 16. The neck 12 is externally threaded for engagement with a gland nut 18 which is used, together with packing 20, to render the upper end of the valve body 10 fluid tight. The valve body has an outlet indicated at 22 and an inlet indicated at 24. The outlet 22 may be of simple character, such as to be found in bibs and faucets, and the inlet 24 includes a barrel portion 26 which, in the form of the invention illustrated in Figure 1 extends downwardly from the reduced diameter section 28 of the valve body.

A valve seat 30 is provided on the side of the reduced diameter section 28 remote from the outlet 22, and a second valve seat 32 is provided on the inner end face of an internally and externally threaded element of adapter type indicated at 34. The barrel portion 26 is internally threaded to receive the threaded portion of the adapter type element 34.

The valve element assembly includes a disc 38 which constitutes a portion of the sealing element proper, and a washer 40 is secured to the peripheral portion of this sealing element disc 38. The washer element 40 is of special construction and will preferably be fabricated from a suitable thermoplastic material or rubber or other suitable material which is durable, very slightly deformable under pressure resilient and elastic to a corresponding degree, and which is completely impervious to the fluid which is to be conducted through the valve. The valve washer 40 has two faces which selectively engage the valve seats 30 and 32, as will be evident from an inspection of Figure 1, and this washer 40 has an internal annular slot formed therein to receive the peripheral portion of the disc 38. Of course, in the event that the washer 40 is molded in situ on the disc 38, the preferred mode of manufacture, the washer need not be conceived of as a slotted element, but it is urged that alternative modes of fabrication may be used in arriving at the valve element illustrated.

The valve element also includes a guiding pin 42 which extends axially of the disc 38 and is secured thereto, and this pin 42 has a portion 44 extending on the opposite side of the disc 38. The inner end of the valve stem 16 is provided with a bore 46 to receive the pin 42 or the portion thereof 44 according to the disposition of the valve element, the reversibility or invertibility of the valve element being thereby provided for, and it should be carefully noted that the bore 46 is of a diameter slightly larger than the diameter of the pin 42, so that the valve stem can be rotated independently of the pin 42 and disc 38. This construction allows the valve stem to be moved into the position indicated in Figure 1 with the valve element washer 40 in sealing engagement with the valve seat 30 and held in such engagement by the pressure in the inlet barrel portion 26. As has been mentioned in the foregoing objects, the advantage of such a construction is that the sealing washer 40 is not forced to rotate after it has come into contact with the valve seat 30, with a consequent reduction in the wear and damage to the washer 40.

The second position 48 of the sealing element is illustrated in dash line in Figure 1, the other face of the washer 40 being now in sealing engagement with the valve seat 32. Of course, the valve stem 16 must be rotated to shift the valve element into this second position, and it will be obvious that the pressure of fluid in the inlet does not assist in the sealing of the valve when the valve element is in this second position.

Figure 3:
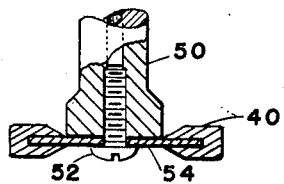
Figure 3 is a fragmentary vertical sectional view of a modified valve element wherein the sealing element per se may be secured rigidly to the valve stem, while retaining its dual function in being engageable selectively with both valve faces and while also retaining the reversible feature.
Figure 2:
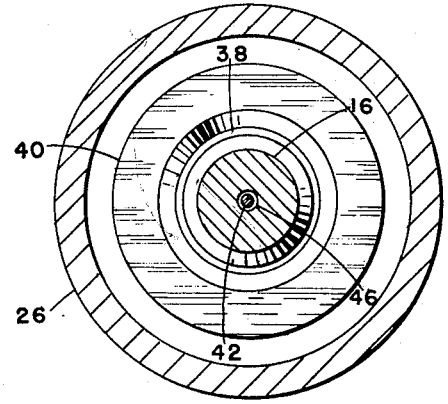
Figure 2 is a horizontal sectional view taken substantially on the line 2—2 in Figure 1.

In a slightly modified form of this invention, the double faced feature and the invertible feature of the valve element is retained, but the sealing element as such is not freely rotatably mounted on the valve stem. This is illustrated by the valve stem 50 in Figure 3, wherein the screw 52 is inserted through the disc 54, apertured to receive the screw which is threaded into the end of the stem 50.

The operation of this invention will be obvious from a consideration of the foregoing description of the mechanical features thereof, taken in connection with the foregoing objects, and further description would appear to be unnecessary.

Obviously, minor variation from the embodiments of this invention illustrated in the foregoing disclosure can be resorted to without departure from the spirit and scope of this invention.

I claim:

A valve comprising a valve body having an inlet and an outlet with a passage therebetween; a valve stem threadedly mounted in said body; confronting valve seats in said body at said outlet and inlet and spaced apart axially in the valve body; a valve sealing element carried into inlet-closing position by said valve stem when said valve stem is moved toward the valve seat at the inlet and otherwise mounted on said valve stem for free movement axially thereof and selectively engaging said valve seats; said sealing element comprising an imperforate disc; and a resilient washer secured peripherally of said disc and having two sealing faces, one on each side of said disc; said sealing faces being selectively engageable in sealing relation with said valve seats; said sealing element being shifted into self-sealing relation with the seat adjacent the outlet by fluid pressure when the valve stem is sufficiently retracted in the corresponding direction; said valve sealing element being capable of arrest without further rotation when the valve stem is retracted therefrom in one direction; said sealing element being reversible; said disc having a pin extending axially therefrom on each side of the disc; and said valve stem having an axial bore in the end thereof, slightly larger in diameter than said pin, and the portions of said pin on opposite sides of the disc being selectively and somewhat loosely retained in said bore.

References Cited in the file of this patent

UNITED STATES PATENTS

| | | |
|---|---|---|
| 392,539 | Christian | Nov. 6, 1888 |
| 594,895 | O'Meara | Dec. 7, 1897 |
| 623,418 | O'Meara | Apr. 18, 1899 |
| 695,016 | Ware | Mar. 11, 1902 |
| 1,882,433 | MacClatchie | Oct. 11, 1932 |
| 1,963,685 | Shimer | June 19, 1934 |
| 2,704,650 | Ranel | Mar. 22, 1955 |

FOREIGN PATENTS

| | | |
|---|---|---|
| 14,499 | Great Britain | 1894 |
| 469,308 | France | May 16, 1914 |
| 215,259 | Great Britain | May 8, 1924 |